(12) United States Patent
Hongo

(10) Patent No.: US 12,003,149 B2
(45) Date of Patent: Jun. 4, 2024

(54) COIL UNIT AND METHOD OF MANUFACTURING COIL UNIT

(71) Applicant: ASTER CO., LTD., Yokote (JP)

(72) Inventor: Takenobu Hongo, Fukushima (JP)

(73) Assignee: ASTER CO., LTD., Yokote (JP)

( * ) Notice: Subject to any disclaimer, the term of this patent is extended or adjusted under 35 U.S.C. 154(b) by 174 days.

(21) Appl. No.: 17/427,299

(22) PCT Filed: Jan. 31, 2020

(86) PCT No.: PCT/JP2020/003626
§ 371 (c)(1),
(2) Date: Jul. 30, 2021

(87) PCT Pub. No.: WO2020/170760
PCT Pub. Date: Aug. 27, 2020

(65) Prior Publication Data
US 2022/0131449 A1 Apr. 28, 2022

(30) Foreign Application Priority Data

Feb. 19, 2019 (JP) ................................. 2019-027556

(51) Int. Cl.
*H02K 3/04* (2006.01)
*H02K 15/00* (2006.01)
*H02K 15/04* (2006.01)

(52) U.S. Cl.
CPC ........... *H02K 15/0081* (2013.01); *H02K 3/04* (2013.01); *H02K 15/0414* (2013.01); *H02K 2203/09* (2013.01)

(58) Field of Classification Search
CPC .. H02K 3/12; H02K 3/18; H02K 3/28; H02K 15/045; H01F 5/00; H01F 5/04
See application file for complete search history.

(56) References Cited

U.S. PATENT DOCUMENTS 7,193,345 B2   3/2007   Shinzaki
8,575,798 B2   11/2013  Takahashi et al.
(Continued)

FOREIGN PATENT DOCUMENTS

CN    1550058 A    11/2004
CN    102918749 A  2/2013
(Continued)

OTHER PUBLICATIONS

Supplementary European Search Report dated Mar. 9, 2022, directed to EP Application No. 20759890.5; 4 pages.
(Continued)

*Primary Examiner* — Leda T Pham
(74) *Attorney, Agent, or Firm* — Morrison & Foerster LLP

(57) ABSTRACT

A coil unit and a manufacturing method of the same are provided which are configured to simplify the configuration of a connection portion between a coil and a wiring material (busbar), to simplify the number of components and a connection step, to prevent an increase in resistance at the connection portion, and to achieve a good connection state. A busbars-welded coil includes a coil made of a wound first metal material, and busbars made of a second metal material connected to end portions of the coil. A welded portion between the end portion of the coil and the busbar is configured by pressure welding with end surfaces butted against each other.

15 Claims, 8 Drawing Sheets

(56) References Cited

U.S. PATENT DOCUMENTS

| | | |
|---|---|---|
| 9,184,638 B2 | 11/2015 | Ueno |
| 10,886,808 B2 | 1/2021 | Masuda |
| 2002/0084713 A1 | 7/2002 | Kuroyanagi |
| 2004/0251752 A1 | 12/2004 | Shinzaki |
| 2009/0096313 A1 | 4/2009 | Harada et al. |
| 2010/0194214 A1 | 8/2010 | Takahashi et al. |
| 2010/0271166 A1 | 10/2010 | Farmer et al. |
| 2011/0127872 A1* | 6/2011 | Podack .............. H02K 15/0421 29/605 |
| 2011/0133581 A1 | 6/2011 | Ha |
| 2013/0009495 A1 | 1/2013 | Ueno |
| 2015/0128406 A1* | 5/2015 | Isoda .................... H02K 3/325 29/596 |
| 2016/0344269 A1 | 11/2016 | Yabe et al. |
| 2016/0380500 A1 | 12/2016 | Oka et al. |
| 2018/0025830 A1* | 1/2018 | Tsukada ................. H01F 37/00 336/198 |
| 2019/0140508 A1 | 5/2019 | Masuda |
| 2019/0348886 A1* | 11/2019 | Hishida ................. H02K 21/16 |
| 2020/0036270 A1* | 1/2020 | Hishida .................... H02K 3/18 |
| 2020/0212770 A1 | 7/2020 | Yoshikawa et al. |
| 2021/0036566 A1 | 2/2021 | Hongo |

FOREIGN PATENT DOCUMENTS

| | | |
|---|---|---|
| DE | 102017205970 A1 | 10/2018 |
| JP | 62-40041 A | 2/1987 |
| JP | 2001-320848 A | 11/2001 |
| JP | 2007-221962 A | 8/2007 |
| JP | 2010-104232 A | 5/2010 |
| JP | 4661849 B2 | 1/2011 |
| JP | 5218772 B2 | 6/2013 |
| JP | 5635674 B1 | 12/2014 |
| JP | 5904698 B2 | 3/2016 |
| JP | 2018-2105 A | 1/2018 |
| JP | 2018-51630 A | 4/2018 |
| JP | 2018-148668 A | 9/2018 |
| JP | 2019-17211 A | 1/2019 |
| JP | 2019-140759 A | 8/2019 |
| WO | 2007/108552 A1 | 9/2007 |
| WO | 2016/129287 A1 | 8/2016 |
| WO | 2018/135086 A1 | 7/2018 |

OTHER PUBLICATIONS

International Search Report dated Mar. 31, 2020, directed to International Application No. PCT/JP2020/003626. 5 pages.
Notice of Reasons for Refusal dated May 16, 2023, directed to JP Application No. 2019-027556; 7 pages.
Office Action dated Jan. 12, 2023, directed to IN Application No. 202147039621; 7 pages.
The First Office Action dated Oct. 27, 2023, directed to CN Application No. 202080007102.X; 18 pages.

\* cited by examiner

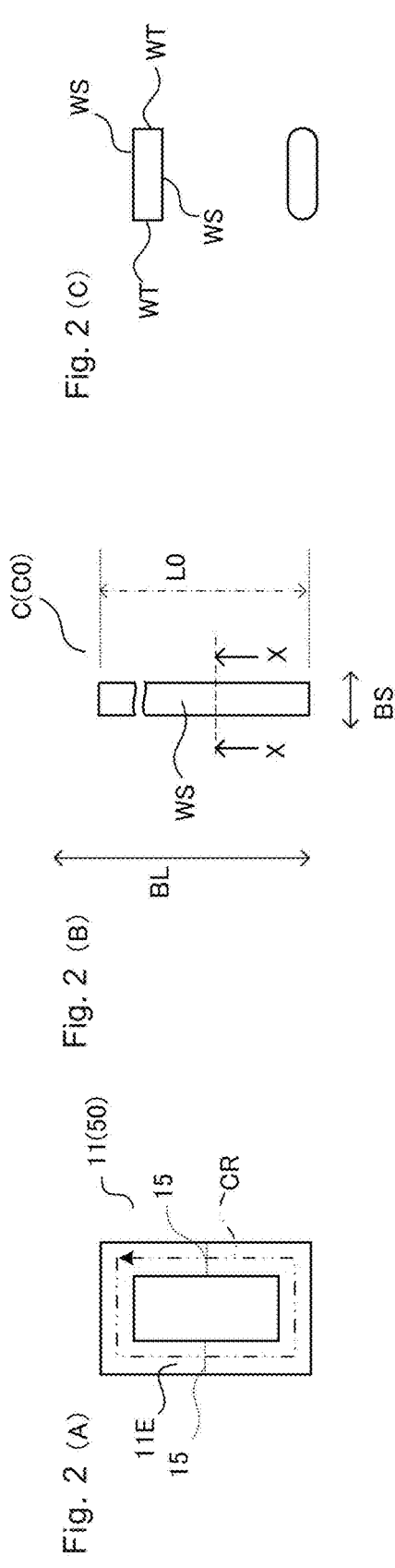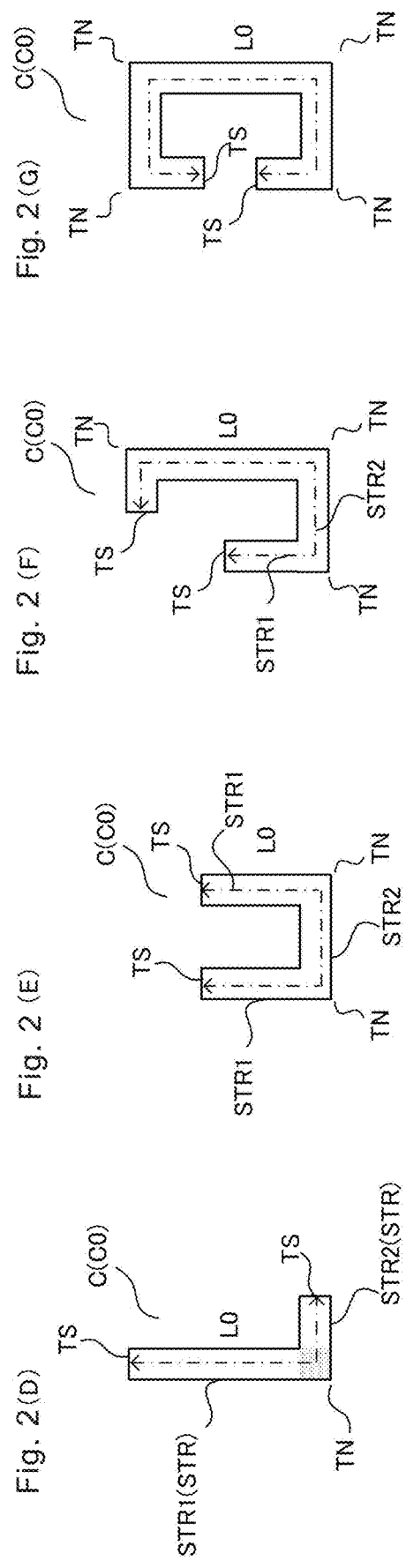

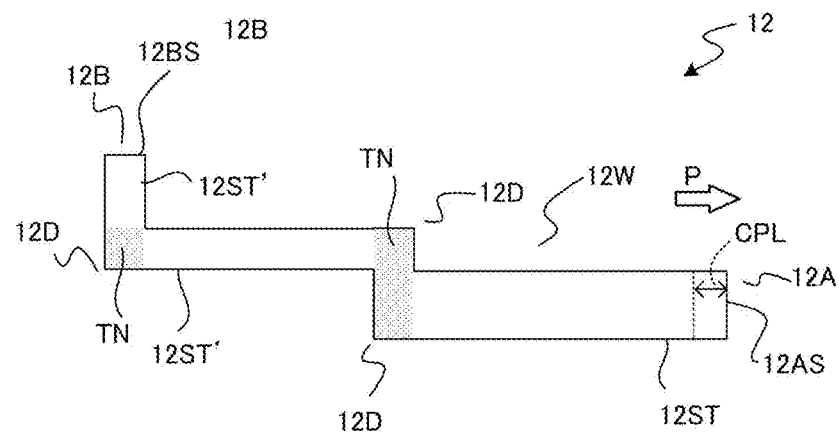
Fig. 3(A)
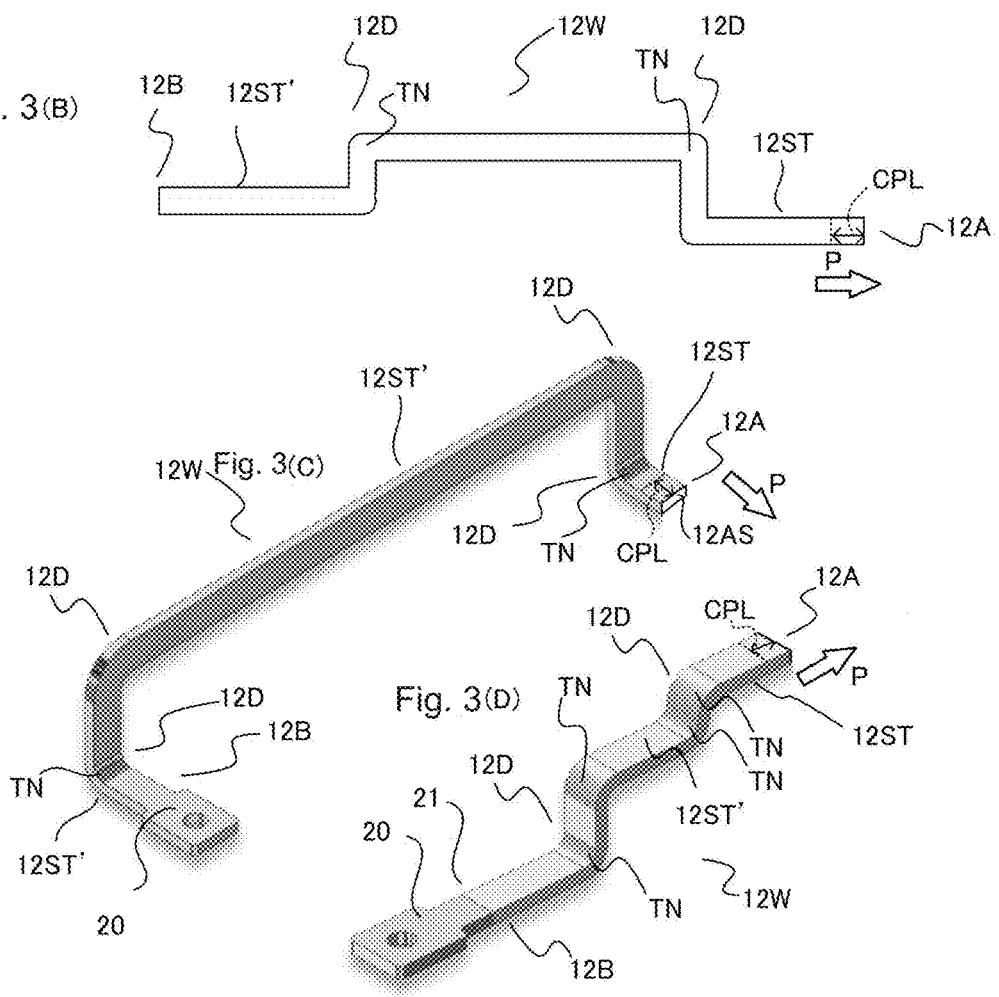
Fig. 3(B)
Fig. 3(C)
Fig. 3(D)

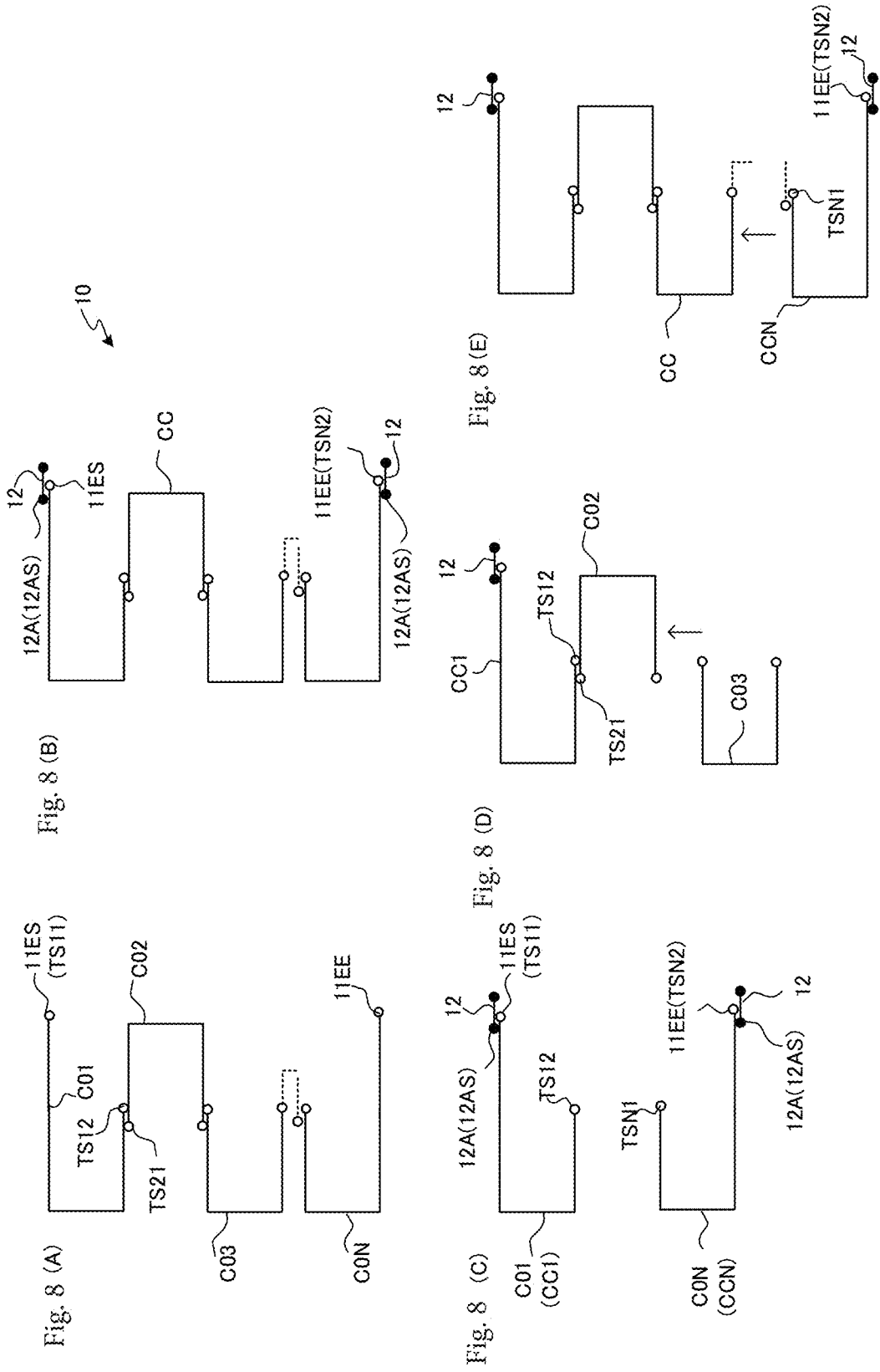

COIL UNIT AND METHOD OF MANUFACTURING COIL UNIT

CROSS-REFERENCE TO RELATED APPLICATIONS

This application is a U.S. national phase patent application of International Patent Application No. PCT/JP2020/003626, filed Jan. 31, 2020, which claims priority to Japanese Patent Application Nos. 2019-027556, filed Feb. 19, 2019, the entire contents of each of which are incorporated herein by reference.

FIELD OF THE DISCLOSURE

The present invention relates to a coil unit and a method of manufacturing the coil unit.

BACKGROUND OF THE DISCLOSURE

Conventionally, in manufacturing a stator constituting a motor, in general, a plurality of coils are annularly disposed by sequentially attaching coils wound on a plurality of slots (teeth) on the inner peripheral surface of an annular stator core, or by sequentially winding a coil member (for example, a copper wire or the like) on the individual slots. In this case, the annularly disposed coils are configured such that both end portions (a starting end portions and a terminal end portions) of winding protrude from one side (the upper side, for example) of the stator core in an axial direction. Furthermore, the both end portions are welded or connected by screwing to wiring members such as a rod-shaped (semi-circular) or annular busbar, which extends in a circumferential direction of the stator core, directly or through joint members (refer to Patent Literatures 1 and 2, for example).

PATENT LITERATURE

Patent Literature 1: Japanese Patent No. 5904698
Patent Literature 2: Japanese Patent No. 4661849

SUMMARY OF THE DISCLOSURE

However, the connection method using welding or screwing has a limitation in downsizing of the completed stator, owing to complexity of the configuration of connected portions. Also, an apparatus for connecting the wiring member (busbar) to the coil, after the coil has been attached to the stator core, is necessary, and thus, there is also a problem of upsizing of a stator manufacturing apparatus, which complicates operations for connection.

When the coil terminal and the wiring member (busbar) are connected by screwing or through a joint member, an increase in resistance of a connected portion is inevitable, as compared to a direct connection between metals. In recent years, coil technology has advanced such that they can reduce resistance themselves. However, the increase in resistance at the connected portion negates any benefit in using low-resistance coils.

Furthermore, there are problems of an increase in the number of components and an increase in complexity of a connection step (increase in man-hour).

In view of these actual circumstances, an object of the present invention is to provide a coil unit and a method of manufacturing the same, configured to simplify the configuration of a connection portion between a coil and a wiring member (busbar), to simplify the number of components and a connection step, to prevent an increase in resistance at the connection portion, and to achieve a good connection state.

An aspect of the present invention provides a coil unit including: a coil made of a first metal material; and a busbar made of a second metal material connected to an end portion of the coil. A welded portion between the end portion and the busbar is configured by pressure welding with end surfaces butted against each other.

An aspect of the present invention also provides a method of manufacturing a coil unit, including: a step of preparing a coil made of a first metal material and a busbar made of a second metal material; and a step of butting an end surface of an end portion of the coil and an end surface of an end portion of the busbar against each other and pressure welding them to form a welded portion.

The present invention can provide a coil unit and a method of manufacturing the same, configured to simplify the configuration of a connection portion between a coil and a wiring member (busbar), to simplify the number of components and a connection step, to prevent an increase in resistance at the connection portion, and to achieve a good connection state.

BRIEF DESCRIPTION OF FIGURES

FIGS. 2(A) to 2(G) include explanatory views illustrating a coil of the present embodiment, in which 2(A) is a front view of the coil, 2(B) is a front view of a coil piece, 2(C) is a cross-sectional view of the coil piece, and 2(D) to 2(G) are front views of coil pieces.

FIGS. 3(A) to 3(D) include schematic views of busbars of the present embodiment, in which 3(A) is a front view, 3(B) is a side view, 3(C) is a perspective view, and 3(D) is a perspective view.

FIGS. 8(A) to 8(E) include schematic views illustrating a method of manufacturing a coil unit of the present embodiment.

DETAILED DESCRIPTION OF THE DISCLOSURE

An embodiment of the present invention will be described below with reference to the drawings.

Figure 1A:
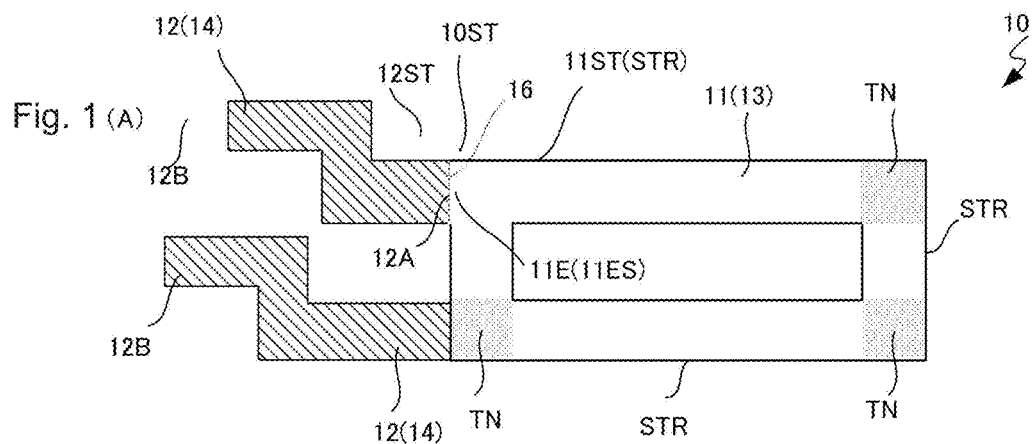
FIGS. 1(A) to 1(C) include schematic views illustrating the appearance of a coil unit of the present embodiment, in which 1(A) is a front view, 1(B) is a side view, and 1(C) is a side view.
Figure 1B:
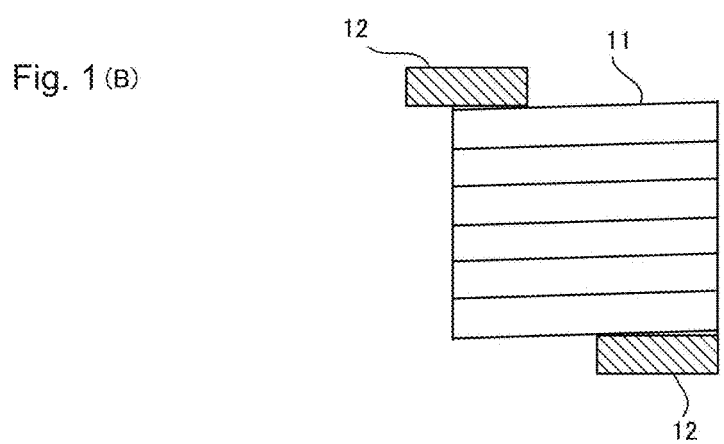
Figure 1C:
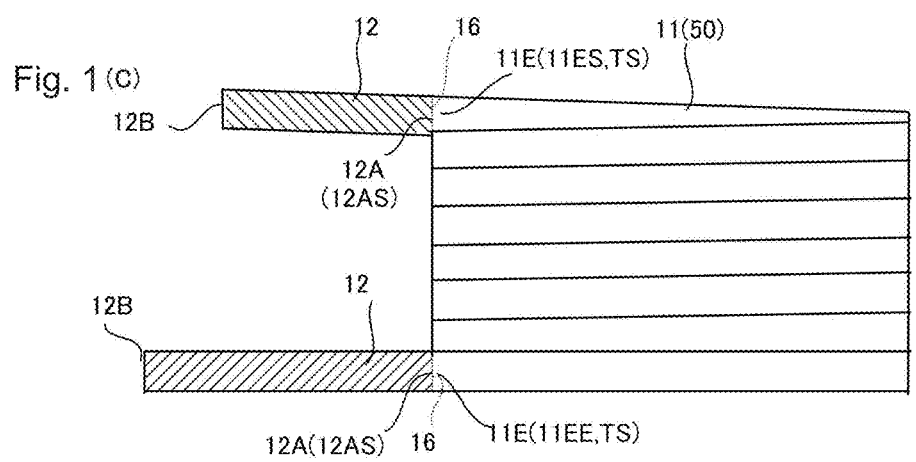

FIGS. 1(A) to 1(C) include schematic external views of a coil unit 10 of the present embodiment, in which FIG. 1(A) is a front view viewed from a helical axis direction, FIG. 1(B) is a side view of FIG. 1(A) viewed from a left direction of the drawing, and FIG. 1(C) is a side view of FIG. 1(A) viewed from a lower direction of the drawing.

FIGS. 2(A) to 2(G) include diagrams illustrating a coil 11 (a helical structure body 50) and examples of a flat conductor C (CO) constituting the coil 11, in which FIG. 2(A) is a front view of the coil 11 (the helical structure body 50) in a complete state viewed from an axial direction of a helical structure, FIG. 2(B) is a front view of the flat conductor C, and FIG. 2(C) is an enlarged view of a cross section along line X-X of FIG. 2(B). Each of FIGS. 2(D) to 2(G) is a front view illustrating an example of the shape of the flat conductor C.

FIGS. 3(A) to 3(D) include schematic views illustrating a busbar 12. FIG. 3(A) is a front view, FIG. 3(B) is a side view, FIG. 3(C) is a perspective view, and FIG. 3(D) is a perspective view.

As shown in FIGS. 1(A) to 1(C), the coil unit 10 of the present embodiment includes a coil 11 made of a first metal material 13, and busbars 12 made of a second metal material 14.

In the coil unit 10 of the present embodiment, the busbar (wiring member) 12 having an optionally selected shape is pressure welded to an end portion 11E (hereinafter referred to as coil end portion 11E) of spiral structure (winding) of the coil 11. The coil unit 10 of the present embodiment is hereinafter referred to as a busbars-welded coil 10. More specifically, the coil 11 has a pair of coil end portions 11E (a starting end portion 11ES and a terminal end portion 11EE), and the busbar 12 is connected to at least one of the coil end portions 11E. As an example, the present embodiment describes the configuration of the busbars-welded coil 10 in which the busbars 12 are connected to both of the coil end portions 11E (the starting end portion 11ES and the terminal end portion 11EE) of the coil 11. Note that, the shape of the busbar 12 is optionally selected, and is not limited to that illustrated in the drawings. In this example, both the busbars 12 have the same configuration (shape), but the busbars 12 connected to the starting end portion 11ES and the terminal end portion 11EE may have different shapes. The busbar 12 may be connected to either of the coil end portions 11E (the starting end portion 11ES or the terminal end portion 11EE).

Herein, a material (the first metal material 13) for the coil 11 is a light metal such as aluminum. A material (the second metal material 14) for the busbar 12 is a metal different from the first metal material 13 in this example, and is preferably a metal with a high electrical conductivity such as copper (Cu). Note that, the first metal material 13 and the second metal material 14 may be the same type (for example, copper or the like) of metal materials.

As an example, the coils 11 of the present embodiment constitute a stator that is attached to the teeth of a stator core. In this case, the coil 11 is configured such that the turn portions of the helical structure of the single coil 11 can be attached to one of the teeth in its entirety. In other words, the coil 11 is a so-called concentrated winding coil in which axes of the turn portions of the helical structure approximately coincide with one another (the turn portions approximately overlap in a helical axis direction of the coil 11). In this example, the coil 11 is a so-called edgewise coil in which a flat conductor is wound, and more specifically, a plurality of strip-shaped flat conductors (coil pieces) each of which has a straight portion are continuously connected so as to form a helical structure body 50.

Referring to FIGS. 2(A) to 2(G), the configuration of the coil 11 will be further described. As already described, in the coil 11 of the present embodiment, a plurality of strip-shaped flat conductors C are joined at their straight portions along a strip longitudinal direction (a helical traveling direction) and end surfaces of the flat conductors C in the helical traveling direction are butted against each other and pressed (pressure welded, for example, cold pressure welded) to be connected so as to form the helical structure body 50 having a desired number of turns. A region (hereinafter referred to as a one-turn region CR) for one turn of the helical structure body 50 has corner portions of winding at an approximately right angle, and has the shape of (approximately) a rectangle on each of an outer peripheral side and an inner peripheral side in front views (FIGS. 2(A) and 1(A)) viewed from an axial direction of the helical structure body 50. The flat conductors C constituting the coil 11 will be also referred to as coil pieces C in the following description.

As shown in FIG. 2(B), the flat conductor (coil piece) C of the present embodiment is a conductor whose cross section (cross section taken along line X-X) when being cut in a direction (strip transverse direction BS) crossing (orthogonal to) a straight portion extending in a strip longitudinal direction BL (a traveling direction of the helical structure) is in the shape of a rectangle or a rectangle with rounded corners, as shown in FIG. 2(C). In other words, the coil piece C has two wider surfaces WS opposite to each other and two narrower surfaces WT opposite to each other, and is a strip member long in a predetermined direction. In the following description, a flat conductor whose cross section orthogonal to the strip longitudinal direction is (approximately) rectangular, as shown in an upper portion of FIG. 2(C), is taken as an example of the flat conductor. End surfaces TS of the coil 11 refer to the surfaces of the coil end portions 11E (the starting end portion 11ES and the terminal end portion 11EE) parallel to a cross section when being cut in a direction crossing (orthogonal to) the straight portion extending in the traveling direction (strip longitudinal direction) of the helical structure.

As shown in FIGS. 2(D) to 2(G), each of the flat conductors (coil pieces) C is formed by punching an aluminum plate, for example (having a thickness of the order of 0.1 mm to 5 mm, for example) into a desired shape, and has at least a straight portion STR. More specifically, the coil piece C has the straight portion and at least one direction changing portion TN. The direction changing portion TN is a bent portion so as to change the extending direction of the strip longitudinal direction. More specifically, the coil piece C has, along the strip longitudinal direction, at least a first straight portion STR1 extending in a first direction, a second straight portion STR2 extending in a second direction, and a direction changing portion TN disposed between the first straight portion STR1 and the second straight portion STR2. Here, each of the straight portions STR (including the first straight portion STR1 and the second straight portion STR2) is a section that is continuous from the end surface TS and has a straight region longer than a pressure welding amount (press length) by pressing.

The coil piece C having the direction changing portion TN is bent in the same direction (always in a right direction or a left direction in a plan view) along the strip longitudinal direction so as to be a helical form when being continuous. It is desirable that at least one (though preferably, all) of the direction changing portions TN is an uncurved-shaped (for example, approximately right angle) corner. In this example, as shown by being hatched in FIG. 2(D), the direction changing portion TN is an approximately square region. The end surface TS of the coil piece C of the present embodiment is situated in the straight portion, excluding the direction changing portion TN, of the coil piece C.

To be more specific, the coil piece C may have any of the shape of a letter L with one direction changing portion TN (FIG. 2(D)), the shape of a letter U with two direction changing portions TN (FIG. 2(E)), the shape of a letter C with three direction changing portions TN (FIG. 2(F)), and the shape of a letter C with four direction changing portions TN (FIG. 2(G)). The plurality of coil pieces C may all have the same shape, or may be any combination of the shapes as illustrated in FIGS. 2(D) to 2(G). The plurality of coil pieces C may be any combination of coil pieces C with at least any of the shapes as illustrated in FIGS. 2(D) to 2(G) and straight coil pieces C (with the shape of a letter I without direction changing portions TN. Furthermore, although not illustrated, the coil piece C may be in the shape of a letter O with four direction changing portions TN. The following example is a case where all the coil pieces C take the shape of a letter U illustrated in FIG. 2(E), as an example.

Such a plurality of flat conductors C are welded by pressure welding (e.g., cold pressure welding) with the end surfaces TS in the helical traveling direction butted against each other. The coil 11 is provided with welded portions 15 (refer to FIG. 2(A)) by pressure welding in the straight portions STR, excluding the direction changing portions TN (indicated by being dot hatched in FIG. 1(A)), of the helical structure body 50 (the one-turn region CR) (the welded portion 15 is not included in the direction changing portion TN (the corner portion)).

Each of the coil end portions 11E has a coil straight portion 11ST. The coil straight portion 11ST is a straight region that is continuous from the end surface TS of the coil 11 and along the press direction P in a press (pressure welding) step. The length of the straight region is longer than the press length (pressure welding amount) CPL. The press length CPL is a length to be shortened in the press step, though this will be described later. The coil straight portion 11ST is also a straight portion STR of a unit coil piece C.

Note that, for the sake of explanation, the welded portions 15 are illustrated by broken lines in FIG. 2(A), but specifically in the case of cold pressure welding, due to atomic bonding of metals, the welded portions 15 are integrally and reliably welded to the extent of being difficult to recognize (almost invisible) by a visual appearance check. Thereby, it is possible to significantly increase the stability of the welded portions 15, as compared to the configuration of planar connection of the plurality of coil pieces C with an adhesive (e.g., a fixing material, brazing, etc.) or the configuration of connection by welding or the like.

Since the shape (specifically, the shape on the inner peripheral side) of the coil 11 is approximately rectangular in a plan view (FIG. 2(A)), it is possible to increase the space factor of the coil 11 in the case of, for example, attaching the coil 11 to a stator of a motor. Therefore, it is possible to decrease the resistance and increase the efficiency of the motor adopting the coils 11.

Furthermore, as compared to a coil of the same shape constituted by copper, for example, the weight of the coil 11 constituted by aluminum can be reduced to one-third, and the cost thereof can also be reduced to one-third.

FIGS. 3(A) to 3(D) and 4(A) to 4(C) include schematic diagrams illustrating examples of the busbar 12. FIG. 3(A) is a front view of the busbar 12 corresponding to FIG. 1(A). FIG. 3(B) is a side view corresponding to FIG. 1(C). FIGS. 3(C) and 3(D) are perspective views. FIGS. 4(A) and 4(B) are front views of the busbars 12 corresponding to FIG. 1(A), and FIG. 4(C) is a perspective view.

Referring to FIGS. 1(A) to 1(D) and 3(A) to 3(C), the busbar 12 is a wiring member for making connection between the coil 11 and an external configuration (for example, another wiring member (another busbar), another component, a terminal, or the like) of the coil 11. The busbar 12 is constituted by a metal material with a good electrical conductivity, for example, copper or the like. The busbar 12 has a first end portion 12A to be connected to the coil end portion 11E and a second end portion 12B to be connected to the external configuration. An end surface 12AS is exposed in the first end portion 12A, and an end surface 12BS is exposed in the second end portion 12B.

The shape of the busbar 12 is optionally selected in accordance with the configuration of an outlet side of the coil 11. For example, as shown in FIG. 3(A), the shape of the first end portion 12A on a side connected to the coil end portion 11E may be the same as that of the coil end portion 11E, i.e., the flat conductor, and the second end portion 12B may have a different shape, i.e., a flat conductor thinner (thicker) than the first end portion 12A, or the like. One or a plurality of bent portions 12D may be included in a two-dimensional plane in a course between the first end portion 12A and the second end portion 12B. As shown in FIGS. 3(B) to 3(D), one or a plurality of bent portions 12D may be included in three-dimensional space, or the bent portion/portions 12D in the two-dimensional plane and the bent portion/portions 12D in the three-dimensional space may be combined.

Furthermore, as shown in FIGS. 3(C) and 3(D), the second end portion 12B may be provided with a terminal (or an engagement portion) 20 for connection to the other configuration, or the like. FIG. 3(C) illustrates a case in which the busbar 12 and the terminal 20 are made of the same metal material (for example, copper), as an example.

As shown in FIG. 3(D), when the second end portion 12B of the busbar 12 is provided with the terminal 20, the busbar 12 and the terminal 20 may be made of different metal materials. By way of example, the busbar 12 may be made of the first metal material 13 (for example, aluminum), which is the same as that for the coil 11, and the terminal 20 may be made of a different metal material (for example, copper).

Figure 4:
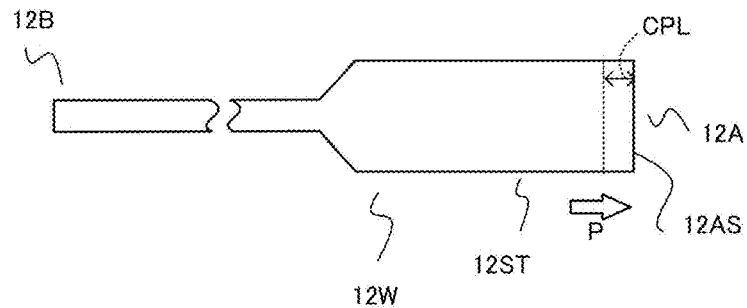
FIGS. 4(A) to 4(C) include schematic views of busbars of the present embodiment, in which 4(A) is a front view, 4(B) is a front view, and 4(C) is a perspective view.
Figure 4:
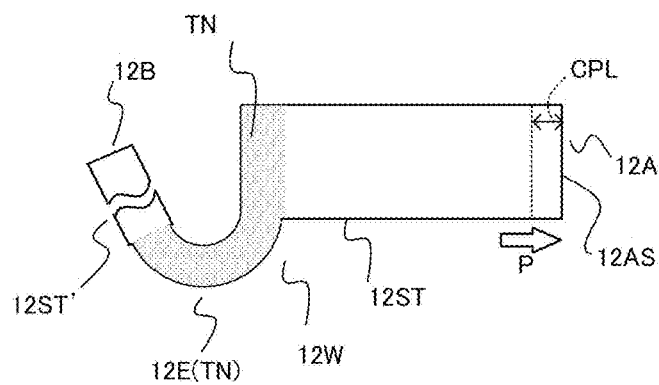
Figure 4:
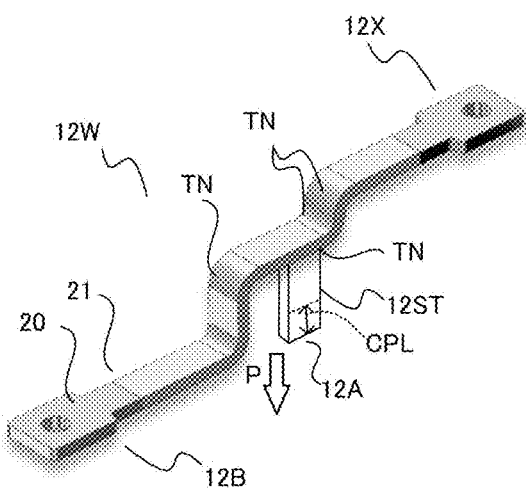

Furthermore, as shown in FIG. 4(A), the shape of the first end portion 12A may be the same as that of the coil end portion 11E, i.e., the flat conductor, and the second end portion 12B may have a different shape such a round wire or the like. As shown in FIG. 4(B), a curved portion 12E may be included. As shown in FIG. 4(C), the busbar 12 may be configured to be bent (branched) in a plurality of directions so as to have a plurality of end portions 12B and 12X, in addition to the first end portion 12A. In this case, the terminal 20 may be connected to at least any of the second end portion 12B and the other end portion 12X. At least any of these (FIGS. 3 and 4) may be combined to configure a busbar 12.

The busbar 12 includes a busbar wiring portion 12W connecting (between) the first end portion 12A and the second end portion 12B. The busbar wiring portion 12W includes at least a busbar straight portion 12ST. The busbar straight portion 12ST of the present embodiment has a straight region that is continuous from the first end portion 12A and along the press direction P in the press (pressure welding) step. The length of the straight region is longer than the press length (pressure welding amount) CPL. The busbar wiring portion 12W may have another busbar straight portion 12ST', in addition to the busbar straight portion 12ST.

To be more specific, the busbar wiring portion 12W has a shape including only the busbar straight portion 12ST (FIG. 4(A)), a shape including the busbar straight portion 12ST, the other busbar straight portion or portions 12ST', and at least one direction changing portion TN (FIGS. 3, 4(B) and 4(C)), or a shape of a combination of at least any of the shapes in shown FIGS. 3(A) to 3(D) and 4(A) to 4(C).

The direction changing portion TN is a bent (curved) portion so as to change an extending direction (the direction of a current path) of the strip longitudinal direction. More specifically, when the busbar wiring portion 12W has a bent shape (FIGS. 3(A) to 3(D), 4(B) and 4(C)), the busbar wiring portion 12W has at least two straight portions (for example, the busbar straight portion 12ST extending in a first direction and the other busbar straight portion 12ST' extending in a second direction) extending in different directions in a current path, and the direction changing portion TN disposed therebetween (there are may be also different two other busbar straight portions 12ST' and the direction changing portion TN disposed therebetween). Note that, the curved portion 12E shown in FIG. 4(B) is a part of the direction changing portion TN.

For example, in the case of the busbar 12 illustrated in FIG. 4(C), the second end portion 12B and the other end portion 12X are branched from the first end portion 12A through the direction changing portions TN, so as to substantially have the shape of a letter T in side view, and the busbar 12 is pressed downward in the drawing. Therefore, in the first end portion 12A, a busbar straight portion 12ST, which is longer than a pressure welding amount CPL, is provided along the press direction P.

In the present embodiment, the coil end portion 11E and the first end portion 12A of the busbar 12 are directly butted against each other and welded. To be more specific, as shown in FIG. 1(A), the end surface TS of the coil straight portion 11ST of the coil end portion 11E and the end surface 12AS of the busbar straight portion 12ST of the first end portion 12A are butted against each other and pressed (for example, cold pressure welded), to form a welded portion 16.

The end surface 12AS of the busbar 12 is a surface of a terminal end that is parallel to a cross section when the first end portion 12A (busbar straight portion 12ST) is cut in a direction crossing (orthogonal to) the press direction P in the press step.

Namely, the welded portion 16 by pressure welding between the coil end portion 11E and the first end portion 12A of the busbar 12 is formed in a straight portion 10ST (straight portion 10ST, excluding the direction changing portion TN, of the busbars-welded coil unit 10) of the busbars-welded coil 10 after welding. In other words, the welded portion 16 is present in a position that is not included in the direction changing portion TN (the corner portion) of the busbars-welded coil 10 (FIG. 1(A)).

The end surface 12AS of the first end portion 12A of the busbar 12 is configured into a shape (size) conformable to, for example, the shape of the coil piece C of the coil end portion 11E.

More specifically, the end surface 12AS of the first end portion 12A (the busbar straight portion 12ST) is configured into a rectangular shape and the same size as the end surface TS (an approximately conformable rectangular shape), so as to be approximately conformable to the shape (a flat rectangular shape in this example) of the end surface TS of the coil straight portion 11ST of the coil end portion 11E. On the other hand, the shape (of the end surface 12BS) of the second end portion 12B is optionally selected according to the shape of a wire or the like to be connected.

In FIGS. 1(A) to 1(C), for the sake of explanation, the welded portions 16 are illustrated by dotted lines, but in the case of cold pressure welding, the welded portions 16 are integrally and reliably welded to the extent of being difficult to recognize (almost invisible) the positions of the end surface TS of the coil end portion 11E and the end surface 12AS of the busbar 12 by visual check of appearance.

When the coil 11 (the first metal material 13) is made of aluminum, for example, and the busbar 12 (the second metal material 14) is made of copper, for example, just as in the case of the present embodiment, since aluminum is apt to oxidize and deform, soldering (brazing) or general welding causes problems in use specifically in a high current range, such as the occurrence of creep deformation and insufficient connection strength. Obtaining sufficient connection strength by welding requires a special method or apparatus, and hence is not easy. Therefore, conventionally, the connection between them is often made by screwing.

However, in the case of connection by screwing, since the configuration of the welded portion 16 is complicated and large in size, there is a limitation in reduction in resistance of the coil 11. There are also problems of an increase in the number of components and the like.

According to the present embodiment, owing to direct pressure welding between the busbar 12 and the coil 11, it is possible to significantly increase the stability of the welded portion 16, as compared to the configuration of connection with an adhesive (a fixing material, brazing, or the like) or connection by welding or screwing, and therefore to obtain sufficient connection strength.

Since the coil 11 and the busbar 12 can be integrally (continuously and smoothly) connected to each other, it is possible to prevent an increase in complexity of the configuration of the welded portion 16 (it is possible to allow the welded portion 16 to have a minimum necessary configuration) and an increase in resistance at the welded portion 16, as compared to the case of connecting the both by welding, bonding, or screwing.

Note that a welded portion 21 between the aluminum busbar 12 and the copper terminal 20, as illustrated in FIGS. 3(D), 4(C), and the like, is also made by pressure welding (cold pressure welding), just as in the case of the welded portion 16 between the coil 11 and the busbar 12 described in the present embodiment. Namely, an end surface of the second end portion 1B of the busbar 12 and an end surface of the terminal 20 on the side of the busbar 12 are butted against each other, and (cold) pressure welded to connect the both.

As described above, according to the busbars-welded coil 10 of the present embodiment, the coil 11 can be constituted by, for example, the light-weight first metal material 13 (for example, aluminum or the like), and the busbar 12 can be constituted by the second metal material 14 (for example, copper or the like) with a good electrical conductivity. Accordingly, as compared to the case of manufacturing the coil 11 of, for example, copper or the like, cost can be reduced to one-third, and weight can be reduced to one-third. Also, even if the coil 11 and the busbar 12 are made of different materials, it is possible to obtain sufficient connection strength. Therefore, the busbars-welded coil 10 is usable in a high current range, and adopting the coil in a motor or the like achieves a reduction in weight and cost and an increase in efficiency.

Furthermore, the coil 11 and the busbar 12 are integrated into a unit. Thus, in a manufacturing process of a stator (motor), for example, attaching the busbars-welded coil 10 of the present embodiment to a stator core eliminates the need for providing a connection step between the coil and the busbar. Namely, since an apparatus (a connection apparatus between a coil and a busbar) for attaching the coil to the stator becomes unnecessary, it is possible to achieve downsizing of a stator manufacturing apparatus and simplification of a stator manufacturing process. In this context, this is not limited to the case where the first metal material 13 and the second metal material 14 are different materials, but the same effects can be obtained even when the same material (for example, copper or the like) is adopted.

Note that, in the busbars-welded coil 10, the coil 11 is covered with a resin in a state of exposing the busbars 12.

Referring to FIGS. 5(A) to 5(F) to 8(A) to 8(E), a method of manufacturing the busbars-welded coil 10 of the present embodiment will be described. FIGS. 5(A) to 5(F) include schematic front views of the coil pieces C viewed in the helical axis direction of the coil 11. FIGS. 6(A) to 6(G) include views illustrating a connection state between the coil 11 and the busbar 12. FIGS. 6(A) to 6(C) are schematic front views of the coil piece C and the busbar 12 viewed in the helical axis direction of the coil 11, and FIGS. 6(D), 6(E), and 6(F) and 6(G) are side views of FIGS. 6(A), 6(B), and 6(C) viewed from a left direction of the drawings, respectively. FIGS. 7(A) to 7(C) include schematic front views of the coil piece C and the busbar 12 viewed from the helical axis direction of the coil 11. FIGS. 8(A) to 8(E) include views for explaining a connection state of the plurality of coil pieces C, which are schematic views in which a state of welding the plurality of coil pieces C is developed as front views. As an example, a method of forming the coil 11 by sequentially pressure welding the plurality of U-shaped coil pieces, as shown in FIG. 2(E) will be described here. In the following description, the coil piece before welding is referred to as a unit coil piece C, and the coil piece after welding is referred to as a welded coil piece CC.

In the following description, the coil piece C includes a helical structure body in which a plurality of coil pieces (flat conductors) C are joined (connected) and before being completed as the coil (helical structure body 50 of a complete state) 11 (the helical structure body to which the coil piece C is to be continuously connected). Namely, in the following description, the coil piece C includes a coil piece (coil piece before connection) of a minimum unit having a straight shape or one or a plurality of direction changing portions TN in the strip longitudinal direction, and a coil piece in which a plurality of coil pieces of the minimum unit are connected to form the helical structure longer than the one-turn region CR of the coil 11 (the helical structure body 50 to be completed). For the sake of explanation, if distinction is required, the coil piece of the minimum unit is referred to as a unit coil piece CO (C01, C02, C03, . . . , and CON). A welded unit of the coil pieces that is constituted of a plurality of the connected unit coil pieces CO and before being the coil 11 (the helical structure body 50 to be completed) is referred to as a welded coil piece CC (CC1, CC2, . . . , and CCN). The helical structure body 50 to be completed (in a complete state) is referred to as the coil 11.

Figure 5:
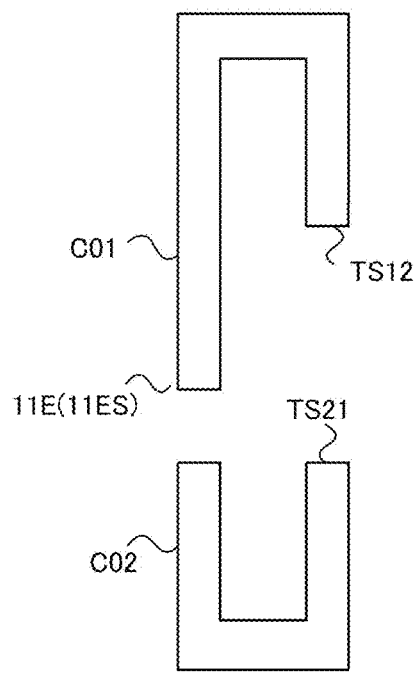
FIGS. 5(A) to 5(F) include schematic front views illustrating a method of manufacturing a coil of the present embodiment.
Figure 5:
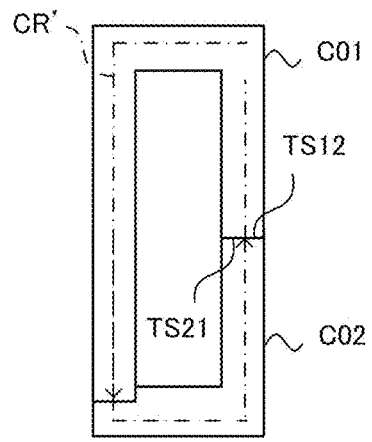
Figure 5C:
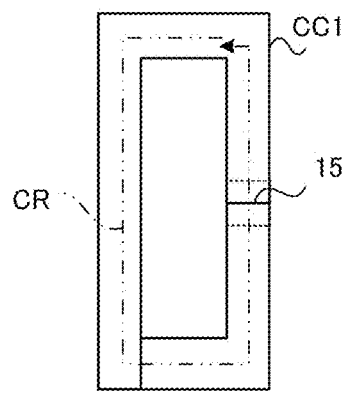
Figure 5:
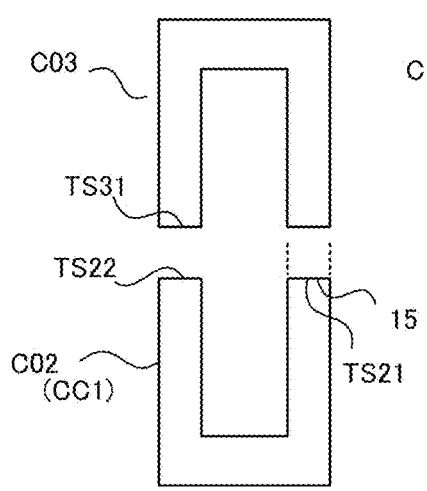

First, as shown in FIG. 5(A), two unit coil pieces C01 and C02 with the shape of a letter U are prepared to form a one-turn region CR1 of a first lap of the helical structure body 50. In this example, the unit coil piece C01 including the coil end portion 11E (the starting end portion 11ES) has the letter U shape in which the length of two long side regions is asymmetrical (an upper portion of FIG. 5(A)). The other unit coil piece C02 has the shape of a letter U in which the length of two long side regions is symmetrical (a lower portion of FIG. 5(A)).

The two unit coil pieces C01 and C02 with the shape of a letter U can form the one-turn region (hereinafter referred to as a virtual one-turn region CR') of a virtual helical structure in a state (state before pressure welding) of end surfaces TS12 and TS21 of the unit coil pieces C01 and C02 being butted against each other, respectively, on one side in the strip longitudinal direction (helical traveling direction) (FIG. 5(B)).

With the use of a not-illustrated welding apparatus (pressure welding apparatus), the unit coil pieces C01 and C02 are held, and the one end surface TS12 of the unit coil piece C01 and the one end surface TS21 of the unit coil piece C02 are butted against each other and pressed (cold pressure welded) to form a welded coil piece CC1. At this time, for example, the welding apparatus makes the length of the one-turn region (welded one-turn region) of the welded coil piece CC1 coincide with the length of the one-turn region CR of the coil 11, by pressing the end surfaces TS12 and TS21 in straight portions of the unit coil pieces C01 and C02 and shortening the lengths of the straight portions (FIG. 5(C)).

Butting and pressing the unit coil pieces C01 and C02 form a welded portion 15, and a burr (not illustrated) protruding in a perpendicular direction with respect to the wider surfaces WS of the coil piece C occurs in the welded portion 15 owing to the press. Accordingly, after formation of the welded portion 15, the burr is removed by cutting or machining Note that, as already described, the welded portion 15 is difficult to recognize (invisible) in actual fact, but is illustrated by a solid line for the sake of explanation (the same is applied hereinafter).

Figure 5E:
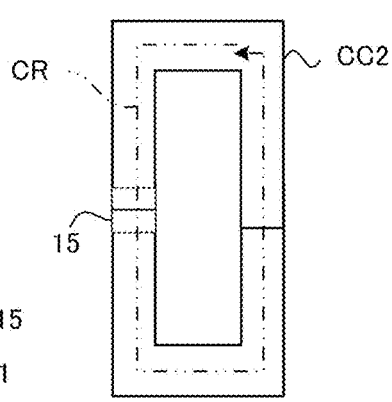
Figure 5F:
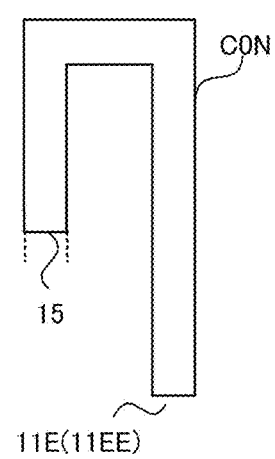

Subsequently, for example, a unit coil piece C03 having the same shape as the unit coil piece C02 is prepared (FIG. 5(D)). The other end surface TS22 of the welded coil piece CC1 (for example, the unit coil piece C02) and one end surface TS31 of the unit coil piece C03 are cold pressure welded in the same manner, to form a welded coil piece CC2 (FIG. 5(E)). In FIGS. 5(D), 5(E), and later, the unit coil piece C01 (the welded unit coil piece C and the welded coil piece CC) is omitted. After pressure welding, a burr at a welded portion 15 is removed.

Subsequently repeating pressure welding and removal of a burr a number of times corresponding to a predetermined number N of turns as necessary, the coil 11 of the helical structure having an N turns of one-turn regions CR is formed (FIG. 8(A)). As shown in FIGS. 7(A) to 7(C), a last unit coil piece CON (a unit coil piece CON including the coil end portion 11E (terminal end portion 11EE)) also has the shape of a letter U in which the length of two long side regions is asymmetrical, just as with the first unit coil piece C01.

Next, as shown in FIGS. 6(A) and 6(D), with the use of the welding apparatus, the starting end portion 11ES of the coil 11 and the busbar 12 are held, and as shown in FIGS. 6(B) and 6(E), the starting end portion 11ES (the end surface TS11) and the end surface 12AS of the first end portion 12A of the busbar 12 are butted against each other, just as in the case of pressure welding of the coil pieces C. As already described, the coil 11 (coil end portion 11E) has the coil straight portion 11ST that is a straight region along the press direction P (indicated with open arrows in FIGS. 6(A), 6(B), 6(D), and 6(E)) and is longer than the press length (pressure welding amount) CPL. The busbar 12 has the busbar straight portion 12ST that is a straight region along the press direction P and is longer than the press length (pressure welding amount) CPL. Namely, the end surface TS11 of the coil straight portion LIST of the coil end portion 11E (starting end portion 11ES) and the end surface 12AS of the busbar straight portion 12ST of the first end portion 12A are butted against each other to be in contact with each other.

As shown in FIGS. 6(C) and 6(F), in a state of butting them against each other, the coil straight portion 11ST and the busbar straight portion 12ST are pressed into each other by the predetermined pressure welding amount (press length) CPL along an extending direction of straight lines of the coil straight portion 11ST and the busbar straight portion 12ST to perform (cold) pressure welding.

Namely, the unit coil piece C01 before welding is set such that the length (the length of the long side region) 11LS of a region to be welded to the busbar 12 along the press direction P is longer than a length (the length of the long side region) 11LE after being welded to the busbar 12 (in a complete state) along the press direction P by the pressure welding amount CPL. In the same manner, the busbar 12 before welding is set such that the length 12LS thereof along the press direction P is longer than a length 12LE after being welded to the coil 11 (in a complete state) along the press direction P by the pressure welding amount CPL (FIGS. 6(B), 6(E), 6(C), and 6(F)).

Thus, as already described, the busbar straight portion 12ST of the busbar 12 is set so as to have the straight region longer than the pressure welding amount CPL.

As described above, the end surface TS11 of the coil straight portion 11ST and the end surface 12AS of the busbar straight portion 12ST are butted against each other and pressed, and shortened each other by the pressure welding amount CPL to form the welded portion 16 between the coil 11 and the busbar 12. Accordingly, the welded portion 16 between the coil 11 and the busbar 12 is also formed in the straight portion 10ST (a region excluding the direction changing portions TN (corner portion: shown by being dot hatched in FIGS. 6(A) to 6(G))) of the busbars-welded coil unit 10. In other words, the welded portion 16 is not included in the direction changing portion TN (corner portion) of the busbars-welded coil unit 10.

In the welded portion 16, a burr 60 protruding in a perpendicular direction with respect to the wider surfaces WS of the coil piece C occurs owing to the press. Accordingly, after formation of the welded portion 16, the burr 60 is removed by cutting or machining (FIG. 6(G)). Note that, as already described, the welded portion 16 is difficult to recognize (invisible) in actual fact, but is illustrated by a solid line for the sake of explanation (the same is applied hereinafter).

As shown in FIGS. 7(A) to 7(C), likewise, with the use of the welding apparatus, the terminal end portion 11EE of the coil 11 and the other busbar 12 are held (FIG. 7(A)), and the terminal end portion 11EE (an end surface TSN2) and the end surface 12AS of the first end portion 12A of the busbar 12 are butted against each other. To be more specific, the end surface TSN2 of the coil straight portion 11ST of the terminal end portion 11EE and the end surface 12AS of the busbar straight portion 12ST of the first end portion 12A are butted against each other to be in contact with each other (FIG. 7(B)).

As shown in FIG. 7(C), in a state of butting them against each other, the coil straight portion 11ST and the busbar straight portion 12ST are pressed into each other by the predetermined pressure welding amount (press length) CPL along the press direction P (indicated with open arrows) to perform (cold) pressure welding. Thereby, the welded portion 16 between the coil 11 and the busbar 12 is formed, and a burr 60 at the welded portion 16 is removed after pressure welding. Accordingly, the busbars-welded coil 10 in which the busbar 12 is connected to each of the starting end portion 11ES and the terminal end portion 11EE of the coil 11 is obtained in this manner (FIG. 8(B)).

Figure 6:
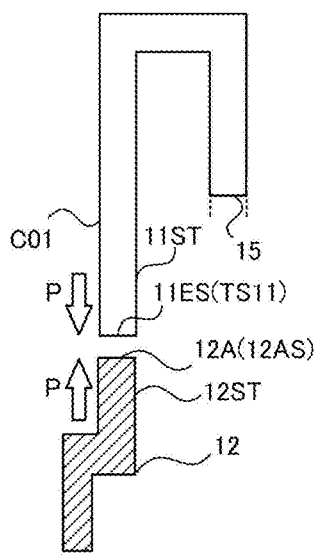
FIGS. 6(A) to 6(G) include views illustrating a method of manufacturing a coil unit of the present embodiment, in which 6(A) to 6(C) are schematic front views and 6(D) to 6(G) are side views.
Figure 6:
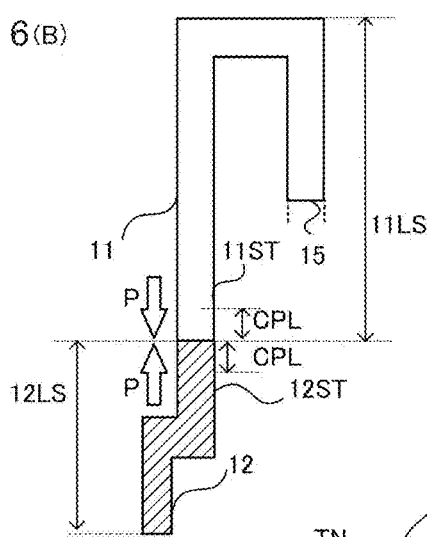
Figure 6:
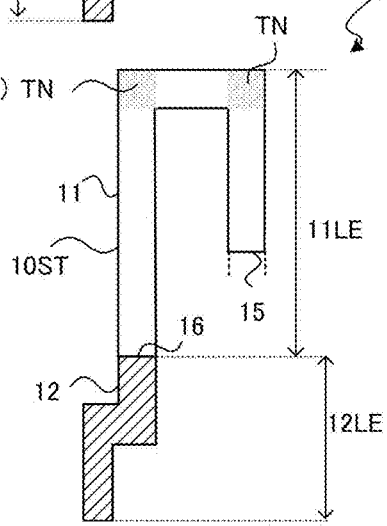
Figure 6:
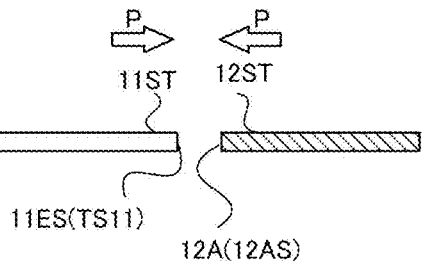
Figure 6:
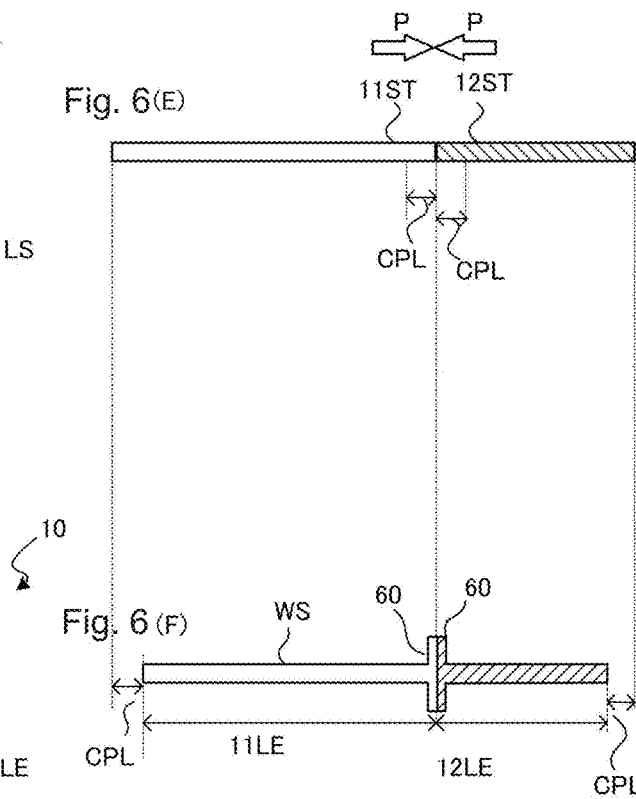
Figure 6:
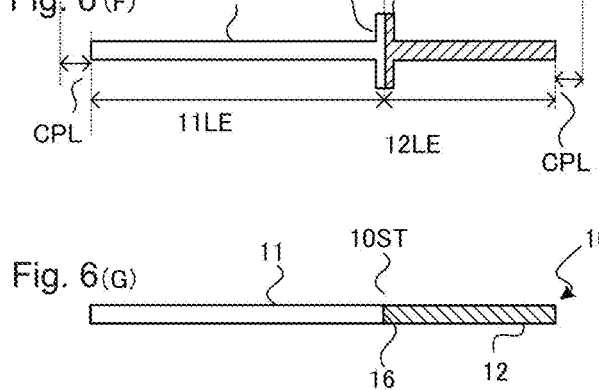
Figure 6:
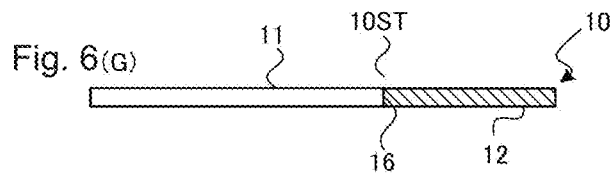
Figure 7:
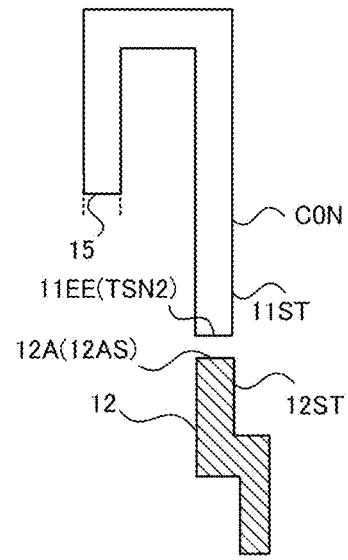
FIGS. 7(A) to 7(C) include schematic front views illustrating a method of manufacturing a coil unit of the present embodiment.
Figure 7:
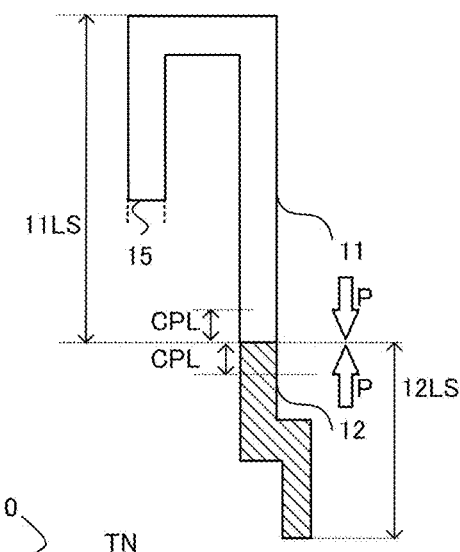
Figure 7:
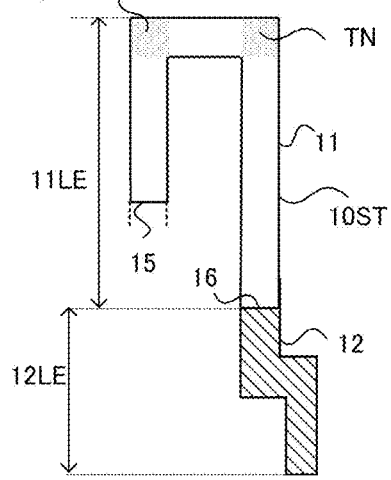

The settings of the length 11LS of a long side region of the unit coil piece CON before connection, which is to be the terminal end portion 11EE of the coil 11 by being connected to the busbar 12, the length 12LS of the busbar 12 before connection, the pressure welding amount CPL, and the lengths 11LE and 12LE thereof after connection are the same as those on the side of the starting end portion 11ES of the coil 11 described in FIGS. 6, (A) to 6(C) and so a description thereof is omitted.

Note that the case of connecting the busbar 12 to the complete coil 11 is described here, but as shown in FIGS. 8(C) to 8(E), the busbar 12 may be pressure welded in advance to each of the unit coil piece C01 to be the starting end portion 11ES and the unit coil piece CON to be the terminal end portion 11EE, and the coil 11 may be manufactured using the unit coil pieces C01 and CON with the connected busbars 12 in the way described above. To be more specific, first, the end surface 12AS of the busbar straight portion 12ST of the first end portion 12A of the busbar 12 and the end surface TS11 of the one coil straight portion 11ST of the first unit coil piece C01 are pressure welded to form a welded coil piece CC1, and a burr at the welded portion 16 is removed after pressure welding. The end surface 12AS of the busbar straight portion 12ST of the first end portion 12A of the other busbar 12 and the end surface TSN2 of the one coil straight portion 11ST of the last unit coil piece CON are pressure welded to form a welded coil piece CCN, and a burr at the welded portion 16 is removed after pressure welding (FIG. 8(C)).

The one end surface TS21 of the next unit coil piece C02 is connected to the other end surface (the other end surface of the unit coil piece 01) TS12 of the welded coil piece CC1, and a burr at the welded portion 15 is removed after pressure welding. After that, the unit coil pieces C are sequentially connected (FIG. 8(D)). The welded coil piece CCN is pressure welded at the end, and a burr is removed to form the busbars-welded coil 10 (FIG. 8(E)).

Note that the busbar 12 with a complete shape, which has already machined (for example, bent or the like) into a predetermined shape as shown in FIGS. 3(A) to 3(D), may be connected, or the busbar 12 may be machined into a predetermined shape after being welded to the coil 11. To be more specific, after a busbar piece longer (larger) than the complete shape may be pressure welded to the coil 11 (or a coil piece C), the busbar piece may be machined into a desired shape (expected as the complete shape) by cutting, punching, removing, or the like.

After pressure welding between the coil 11 and the busbar 12, the coil 11 is covered with a resin in a state of exposing a portion of the busbar 12.

The coil 11 of the present embodiment has been described above with taking the edgewise coil in which the plurality of coil pieces C are pressure welded to form the helical structure as an example, but not limited to this. The coil 11 may be one in which a plurality of coil pieces (conductors) C having the shape of a round wire whose cross section crossing (orthogonal to) a longitudinal direction is approximately round are prepared and the end surfaces thereof in a strip longitudinal direction are pressure welded to form the helical structure. The coil 11 may be one that is made of wind around a desired number of turns of a continuous long flat conductor or round wire conductor, or that is partly made by butting and pressure welding end surfaces of a plurality of flat conductors (round wire conductors) and is partly made by winding around.

The above example describes a case where the coil 11 is made of aluminum and the busbars 12 are made of cupper, but the coil 11 and the busbars 12 may be made of any metal materials, as long as they are applicable to cold pressure welding, such as non-ferrous metal materials. More specifically, each of the first metal material 13 and the second metal material 14 may be a metal material such as aluminum, an aluminum alloy, a copper nickel alloy, brass, zinc, silver, a silver alloy, nickel, gold, or another alloy, for example, or may be a material including tin plating, silver plating, or nickel plating. The coil 11 (the first metal material 13) and the busbar 12 (the second metal material 14) may be made of the same type (same) of metal materials.

The busbars-welded coil 10 of the present embodiment may contain a third metal material that is different from either of the first metal material 13 or the second metal material 14. In this case, an end surface of an end portion of the third metal material may be butted against the end surface of the coil 11 and/or the end surface of the busbar 12 and (cold) pressure welded to each other.

The shape of the direction changing portion TN is not limited to approximately square in plan view, but may be curved with a predetermined curvature.

The present invention is not limited to the embodiment described above, but as a matter of course, various modifications may be made within a range without deviating from the gist of the present invention.

The present invention can be applied to stators and motors.

REFERENCE SIGNS LIST

10 coil unit (busbars-welded coil)
10ST straight portion
11 coil
11E coil end portion
11ST coil straight portion
12A first end portion
12B second end portion
12D bent portion
12E curved portion
12ST busbar straight portion
12W busbar wiring portion
15 welded portion
16 welded portion
20 terminal
21 welded portion
50 helical structure body
60 burr

The invention claimed is:

1. A coil unit comprising:
a coil made of a wound first metal material; and
a busbar made of a second metal material connected to an end portion of a winding of the coil on a winding start side and/or a winding end side, wherein
a welded portion between the end portion and the busbar is configured by pressure welding with end surfaces butted against each other;
the coil is bent in one direction;
the coil constitutes a helical structure body by welding a plurality of strip-shaped flat conductors;
the coil has a coil straight portion that is continuous from the end surface of the coil and that extends in a direction crossing the end surface and of a long side of the winding;
the busbar is constituted by a flat conductor;
the busbar has a busbar straight portion that is continuous from the end surface of the busbar; and
the end surfaces of the busbar and coil are butted against each other along an extending direction of a straight line between the busbar straight portion and the coil straight portion that extends in the direction of the long side of the winding.

2. The coil unit according to claim 1, wherein the first metal material and the second metal material are the same type metal materials.

3. The coil unit according to claim 1, wherein the first metal material and the second metal material are different metal materials.

4. The coil unit according to claim 1, wherein welded portions of the plurality of strip-shaped flat conductors are configured by pressure welding end surfaces, which have been butted against each other, of the plurality of strip-shaped flat conductors in a helical traveling direction.

5. The coil unit according to claim 1, wherein the coil is an edgewise coil in which corner portions of winding are configured at a substantially right angle.

6. The coil unit according to claim 1, wherein the coil is covered with a resin.

7. A method of manufacturing a coil unit for connecting a busbar made of a second metal member to an end portion of a winding of a coil, which is made of a wound first metal member, on a winding start side and/or a winding end side, comprising:
the coil constitutes a helical structure body by strip-shaped flat conductors;
the coil is bent in one direction,
the coil has a coil straight portion that is continuous from an end surface of the coil and that extends in a direction crossing the end surface and of a long side of the winding;
the busbar is constituted by a flat conductor;
the busbar has a busbar straight portion that is continuous from an end surface of the busbar, that extends in a direction crossing the end surface, and has a straight region that is continuous from a first end portion of the busbar and along a press direction in a press step of pressure welding, a length of the straight region being longer than a press length, the press length being a length to be shortened in the press step; and
the end surfaces of the busbar and coil are butted against each other along an extending direction of a straight line between the busbar straight portion and the coil straight portion that extends in the direction of the long side of the winding.

8. The method of manufacturing a coil unit according to claim 7, wherein the first metal material and the second metal material are the same type metal materials.

9. The method of manufacturing a coil unit according to claim 7, wherein the first metal material and the second metal material are different metal materials.

10. The method of manufacturing a coil unit according to claim 7, comprising a step of preparing the strip-shaped flat conductors to be a helical structure body when being joined, and butting end faces of the strip-shaped flat conductors in a helical travel direction against each other and pressure welding them to form the coil.

11. The method of manufacturing a coil unit according to claim 7, wherein the flat conductor includes a straight portion and a corner portion, and the corner portion is formed by punching at a substantially right angle.

12. The method of manufacturing a coil unit according to claim 7, comprising a step of covering the coil with a resin.

13. The coil unit according to claim 1, wherein the busbar has the busbar straight portion and at least one direction changing portion which is bent so as to change an extending direction of a strip longitudinal direction.

14. The method of manufacturing a coil unit according to claim 7, wherein the busbar has the busbar straight portion and at least one direction changing portion which is bent so as to change an extending direction of a strip longitudinal direction.

15. The method of manufacturing a coil unit according to claim 7, wherein the flat conductor includes a straight portion and a corner portion, and the corner portion is formed by punching at a substantially right angle.

* * * * *